UNITED STATES PATENT OFFICE.

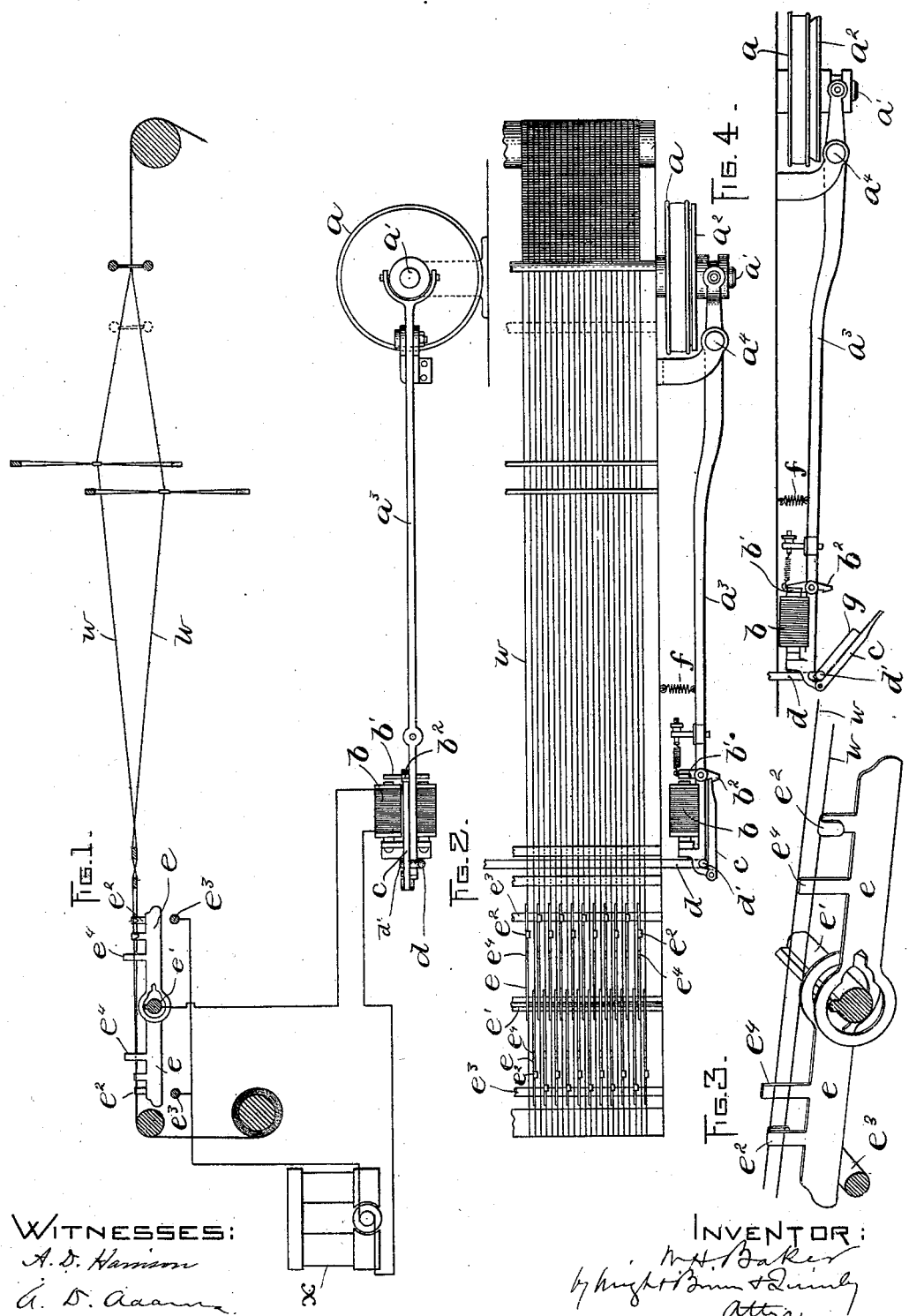

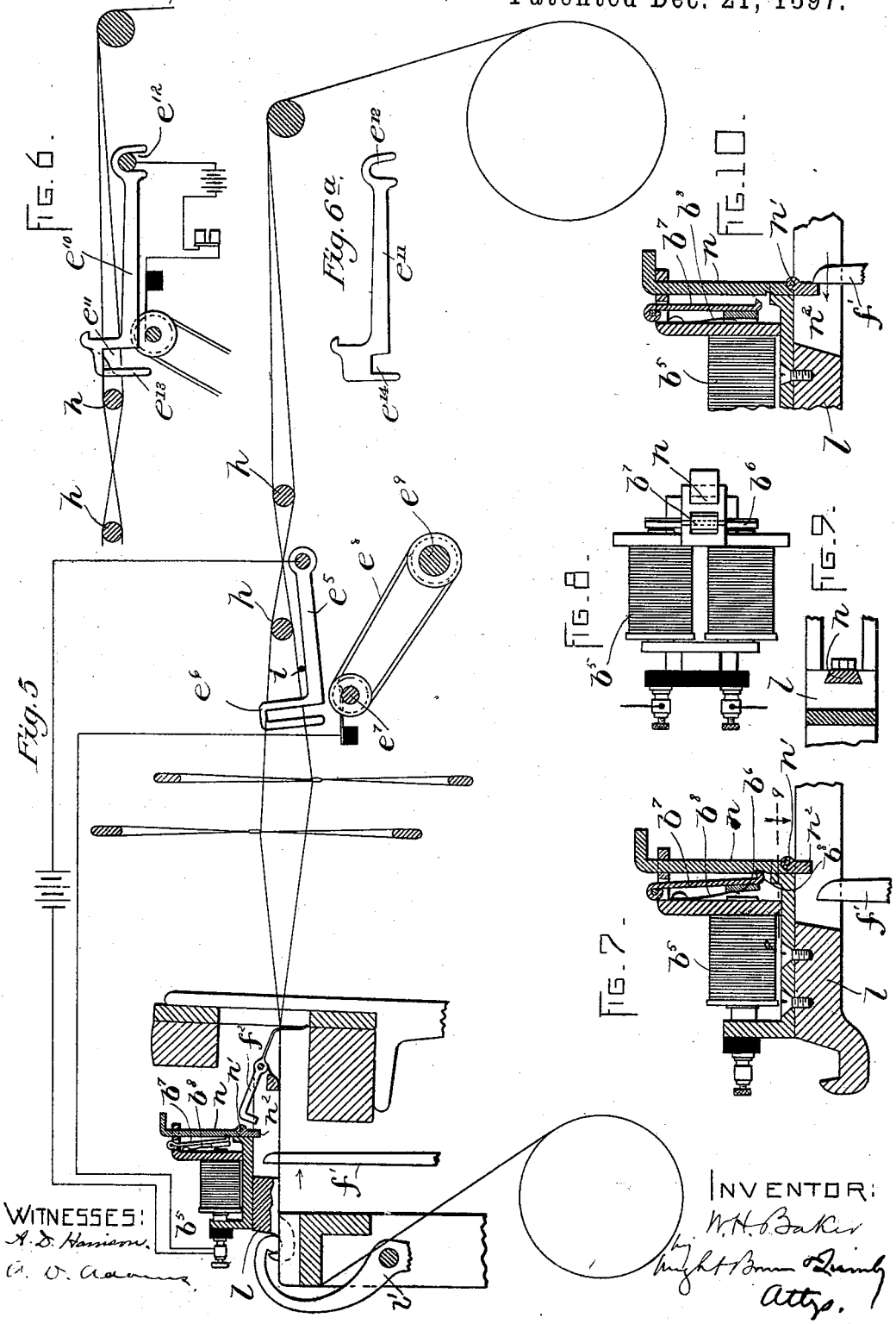

WILLIAM H. BAKER, OF PAWTUCKET, RHODE ISLAND, ASSIGNOR, BY DIRECT AND MESNE ASSIGNMENTS, TO FRED M. ARMSTRONG, OF SAME PLACE.

WARP STOP-MOTION FOR LOOMS.

SPECIFICATION forming part of Letters Patent No. 595,688, dated December 21, 1897.

Application filed March 6, 1896. Serial No. 582,020. (No model.)

*To all whom it may concern:*

Be it known that I, WILLIAM H. BAKER, of Pawtucket, in the county of Providence and State of Rhode Island, have invented certain new and useful Improvements in Warp Stop-Motions for Looms, of which the following is a specification.

This invention relates to means for automatically stopping a loom upon the breakage of a warp-thread therein; and it has for its object to provide simple and effective electromechanical means whereby the clutch which connects the driving-shaft of the loom with a loose driven pulley thereon may be automatically disconnected upon the breakage of a warp-thread.

The invention consists in the improvements which I will now proceed to describe and claim.

Of the accompanying drawings, forming a part of this specification, Figure 1 represents a diagrammatic view showing a loom-stopping apparatus embodying my invention. Fig. 2 represents a top view of the construction shown in Fig. 1. Fig. 3 represents a perspective view of a portion of the apparatus. Fig. 4 represents a plan view of part of the apparatus shown in Fig. 2, showing the clutch members disconnected, as by the breakage of a warp-thread. Fig. 5 represents a diagrammatic view showing a somewhat different arrangement of mechanism embodying my invention. Fig. 6 represents a view of a modification of the arrangement shown in Fig. 5. Fig. 6$^a$ shows a detail of one of the contact-arms of the mechanism shown in Fig. 6. Figs. 7, 8, 9, and 10 represent details of the mechanism shown in Fig. 5.

In the drawings, $a$ represents a loose driving-pulley mounted upon the shaft $a'$ of a loom.

$a^2$ represents a clutch member which is rotatively engaged with the driving-shaft and is movable into and out of engagement with the pulley $a$, and $a^3$ represents a clutch-lever or shipper which is pivoted to the loom at $a^4$ and is engaged with the clutch member $a^2$ in such manner as to move the same into and out of engagement with the corresponding member formed on the pulley $a$. An actuator is provided which is adapted to move the lever $a^3$ into position to separate the clutch members and thus stop the loom, said actuator being shown in Figs. 2 and 4 as a spring $f$ connected with the lever $a^3$ and with the frame of the loom, said spring when free to act moving the lever $a^3$ from the position shown in Fig. 2, which represents the clutch member $a^2$ in its operative position, to the position shown in Fig. 4, which represents the clutch member disconnected from the driving-pulley.

The mechanism above described is of a type common in looms and is here shown and described as illustrating a suitable means for carrying my invention, hereinafter described, into effect. Said invention is not, however, limited to this particular form of clutch-operating mechanism.

In connection with the clutch-lever and its actuator I employ an actuator-restraining mechanism which, when all the warp-threads are intact, prevents the actuator from operating and maintains the clutch members in engagement with each other. The said restraining mechanism comprises a source of electricity $x$, such as a dynamo or battery, a series of contact-arms $e$, hung to oscillate upon a fixed support $e'$, extending across the warp-threads $w$, the said contact-arms being provided at their swinging ends with hooks $e^2$, each of which is adapted to engage a warp-thread, an elongated contact-piece $e^3$, extending across the warp-threads and arranged to support the contact-arms $e^2$ and make electrical contact therewith when said arms are released by the breakage of the warp-threads that support them, an electromagnet $b$, having an armature $b'$, and an operating or controlling device connected with said armature for making the restraining mechanism operative and inoperative. I have shown the contact-arms extending alternately in opposite directions from the support $e'$ and a contact-piece $e^3$ for each set of arms. In this way a greater number of arms can be grouped together than if all projected from the same side of the support $e'$. The dynamo, the circuit-closing arms $e$, and contact-piece $e'$, and the electromagnet are included by suitable connections in an electric circuit, which is closed by the contact of either of the arms $e$ with the contact-piece $e^3$. The said operating or controlling device, as shown in Figs. 1, 2, and 4, comprises a hooked lever or detent $b^2$, which supports the armature and is pivoted to the clutch-lever $a^3$, (the magnet $b$ being also mounted on said lever,) and a latch or shipper-controller $c$, which is pivoted at $c'$ to the clutch-lever and is adapted to be engaged at its free end by the hooked lever $b^2$, as shown in Fig. 2. When the latch $c$ is thus engaged, a stud $d'$, which is suitably secured to the frame of the machine, is confined between the clutch-lever and latch, as shown in Fig. 2, the clutch-lever being thus held in its clutch-engaging position. When the circuit is closed through the electromagnet, the armature $b'$ is attracted and displaces the hooked lever $b^2$, as shown in Fig. 4, thus releasing the latch $c$ and permitting the clutch-lever to be moved inwardly by the actuator $f$, as shown in Fig. 4, the clutch member $a'$ being thus separated from the driving-pulley and the operation of the loom stopped. The stud $d'$ projects upwardly from a bar $d$, which is movable across the frame of the machine and is adapted to be locked or secured to the frame. Said bar or rod is simply slid in its supports and locked by any suitable means, such as a set-screw or other clamp. The stud $d'$ is engaged with a loop $g$, attached to the latch $c$ on the side toward the lever and may be used to restore the latch to engagement with the hooked lever $b'$ before starting the loom, the rod $d$ being moved inwardly to swing the latch into engagement with the hooked lever, and then after such engagement moved outwardly to restore the clutch-lever to the position shown in Fig. 2, after which the rod $d$ may be again locked to the frame of the machine.

It will be seen from the foregoing that whenever a warp-thread breaks the contact-arm $e$ supported thereby falls and makes contact with the contact-piece $e^3$, thus making the actuator-restraining mechanism inoperative, so that the actuator moves the clutch-lever to the position to stop the loom.

In Fig. 5 I show a different type of actuator and actuator-restraining mechanism, the actuator being a lever $f'$, which is oscillated by the power of the machine and is, in fact, the lever which is commonly employed in connection with a pivoted latch or weft-fork $f^2$, mounted on the usual knock-off part or slide $l$, said latch $f^2$ being normally held above the path of the oscillating actuator $f'$ by a filling-thread and allowed to drop into the path of said actuator when the filling-thread breaks, so that the actuator engaging the latch $f^2$ moves the knock-off $l$ backwardly and causes it to move the knock-off slide or shipper lever $l'$, which communicates motion to a clutch-lever and causes the stoppage of the loom through connections and in a manner so well known in the art as to require no illustration or description here. I have not illustrated the knock-off lever and clutch-lever employed in this embodiment of my invention, as the same are well known, and therefore require no special description. In this case I utilize the knock-off slide to support the electromagnet which controls the operating device, whereby the actuator-restraining mechanism is made alternately operative and inoperative. In this case the said operating device comprises a controlling member in the form of a vertically-movable slide or dog $n$, which has a rule-joint at $n'$, so that its lower end $n^2$ will yield to the actuator $f'$ when the latter is moving in the direction indicated by the arrow in Fig. 5 and will engage said actuator when it is moving in the direction indicated by the arrow in Fig. 10. The electromagnet here indicated, $b^5$, has its armature $b^6$ affixed to a pivoted lever or detent $b^7$, one end of which has a hook $b^8$, engaging a notch in the operating or controlling device $n$ when the magnet is not energized, the armature and lever being held in the position shown in Figs. 5 and 7 by a spring $b^8$. When the circuit is closed and the magnet $b^5$ energized, the armature is attracted, as shown in Fig. 10, and releases the operating or controlling device $n$, causing it to drop into the path of the actuator $f'$. The contact-arms employed in this embodiment of my invention and indicated $e^5$ are provided at their free ends with comparatively deep hooks $e^6$, each of which is adapted to bestride two adjacent warp-threads, the depth of the hooks being sufficient to permit the opposite movement of the warp-threads required by the play of the heddles without disengaging said threads from the hooks. At the same time the circuit will not be closed by the hook moving down with either thread, for the other thread is simultaneously rising and will take the hook before it has descended far enough to make contact, and only in the event of a breakage or failure of one of the threads will the hook descend into contact with the circuit-terminal. By this arrangement I enable one contact-arm to serve for two warp-threads. The contact-arms are made of very thin sheet metal and are relatively wide, the object of which is to provide for assembling a great number of hooks close together side by side without danger of their becoming entangled. It will be seen that thin, flat, and wide hooks have a great advantage in this respect over hooks made of wire. The contact-piece which coöperates with the contact-arms and is here indicated $e^7$ is rotated in suitable bearings by means of a belt $e^8$, driven by a shaft $e^9$, which is rotated by the power of the loom. The object of rotating the contact-piece $e^7$ is to prevent interference with an operative electrical contact by particles of lint deposited on the contact-piece, the rotation of the contact-piece causing any lint that may have been deposited thereon to be scraped away by a contact-arm when the latter drops upon the contact-piece.

$i$ represents a fixed rod or stop which extends across the contact-arms $e^5$ above the same to prevent said arms from being thrown upwardly by the upper warp-threads sufficiently to disengage their hooks from the lower warp-threads. The contact-arms in this instance are pivoted between the lease-rods $h\ h$. In Fig. 6 I show a contact-arm $e^{10}\ e^{11}$ of a somewhat different form pivoted back of the lease-rod and having open eyes $e^{12}$ engaged with the pivot-rod, so that the arms can be readily removed.

In all cases I prefer to arrange the contact-arms so that when they are supported by the warp their upper edges will be at a uniform height, so that they will present a uniform appearance when thus supported and will show a gap where any warp-thread has broken and permitted the accompanying hook to fall, thus making it easy to locate the broken thread.

In the construction shown in Figs. 1, 2, and 3 the contact-arms are placed near the lease-rods, so that the portions of the warp-threads which support them have little or no vertical movement. Hence the upper edges of the contact-arms can readily be caused to present the desired uniform appearance. In this case the arms $e$ are provided with upwardly-projecting fingers $e^4$, which stand in line with each other when the arms are supported by the warp-threads, the finger on any displaced arm standing out of line with the others and enabling the broken thread to be readily located.

In the construction shown in Fig. 5 the arms are supported by the upper warp-threads at points between the lease-rods and the heddles. In the construction shown in Figs. 6 and $6^a$ the contact-arms are supported by the parts of the warp-threads which have no vertical motion, and to compensate for the slight variation between the heights of the adjacent warp-threads caused by the lease-rods I make the hooks $e^{13}\ e^{14}$ of varying depth, the hook $e^{13}$ resting on the higher warp-thread being deeper than that $e^{14}$ on the lower.

To reduce friction between the hooks of the circuit-closing arms and the warp-threads, I provide the hooks of said arms with antifrictional coatings or facings arranged to bear on the warp-threads, such facings being, for example, composed of enamel applied to the hooks in any suitable way. Any other suitable material may be used for the same purpose.

The specific construction of the feelers or contact-arms is to be particularly noted, as to that construction are attributable certain advantages presently to be enumerated. Ordinarily the warp-threads lie so closely together that it is a difficult matter to assemble the feelers in engagement with the threads and have them operate without interference and without becoming entangled. It will be observed that I employ contact-arms in the form of very thin flat and wide sheet-metal strips. The preferred construction is that shown in Figs. 5 and 6, where the arm will be observed to be devoid of any lateral projections. It will be obvious that this construction of contact-arm or feeler permits of a very close assemblage of a number of them and overcomes any difficulty about accommodating a sufficient number in the allotted space. The metal of the arms is so very thin that they can be easily accommodated, however closely the warp-threads may lie together. Again, the extra width of the arms allows for an adequate up-and-down movement without so far passing each other as to make possible any interference.

I claim—

1. In a warp stop-motion for looms, the combination of a shipper, means for vibrating or reciprocating the same to clutch and unclutch the driving mechanism of the loom, a controlling member movable on the shipper to permit and to prevent an unclutching movement of the latter, a detent engaging said controlling member to hold it in position to prevent unclutching of the driving mechanism, an armature compounded with said detent, an electromagnet, a circuit embracing the same, and a warp-controlled circuit-closer whose operation causes the said magnet to attract the armature and thereby displace the detent and release the shipper-controller allowing the latter to move to position permitting unclutching of the mechanism, substantially as described.

2. In a warp stop-motion for looms, the combination with a clutch-lever and actuator therefor exerting itself to move the lever to unclutching position, of a latch on the lever, a detent for engaging the latch, a holding-bar engaging the latch to hold the clutch-lever in clutching position when said latch is engaged by the detent, an electromagnet arranged to attract the detent, a circuit embracing said magnet, and a warp-controlled circuit-closer.

3. In a warp stop-motion for looms, the combination with a clutch-lever and actuator therefor exerting itself to move the lever to unclutching position, of a latch pivoted at one end to the lever, a detent pivoted to the lever and arranged to engage the opposite or free end of the latch, a holding-bar engaging the latch and acting thereagainst in opposition to the aforesaid actuator to hold the lever in clutching position, an electromagnet carried by the lever in position to influence the detent, a circuit embracing said magnet, and a warp-controlled circuit-closer.

4. In a warp stop-motion for looms, the combination with a clutch-lever and actuator therefor exerting itself to move the lever to unclutching position, of a latch pivoted at one end to the lever and having a loop on the side toward the lever, a holding-bar projecting into said loop, a detent on the lever and arranged to engage the free end of the latch, an electromagnet carried by the lever in position to influence the detent, a circuit embracing said magnet, and a warp-controlled circuit-closer.

5. In an electrical warp stop-motion for looms, the combination with the thread-supported circuit-closers, of a rotary contact-bar for said circuit-closers to engage, a circuit embracing said bar and closers, and electrically-controlled clutch-shipping mechanism.

In testimony whereof I have signed my name to this specification, in the presence of two subscribing witnesses, this 19th day of February, A. D. 1896.

WILLIAM H. BAKER.

Witnesses:
C. F. BROWN,
A. D. HARRISON.